United States Patent
Dintenfass et al.

(10) Patent No.: US 10,992,796 B1
(45) Date of Patent: Apr. 27, 2021

(54) SYSTEM FOR DEVICE CUSTOMIZATION BASED ON BEACON-DETERMINED DEVICE LOCATION

(71) Applicant: BANK OF AMERICA CORPORATION, Charlotte, NC (US)

(72) Inventors: Katherine Dintenfass, Lincoln, RI (US); Jon David Neckes, Winchester, MA (US); Leslie Richard Rhyne, Bend, OR (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/837,832

(22) Filed: Apr. 1, 2020

(51) Int. Cl.
| | |
|---|---|
| H04M 1/72457 | (2021.01) |
| H04W 4/021 | (2018.01) |
| H04W 76/10 | (2018.01) |
| G01S 19/51 | (2010.01) |
| H04L 29/08 | (2006.01) |
| H04W 16/18 | (2009.01) |
| G01S 1/68 | (2006.01) |
| H04W 4/02 | (2018.01) |

(52) U.S. Cl.
CPC .......... *H04M 1/72457* (2021.01); *G01S 1/68* (2013.01); *G01S 19/51* (2013.01); *H04L 67/26* (2013.01); *H04W 4/021* (2013.01); *H04W 4/023* (2013.01); *H04W 16/18* (2013.01); *H04W 76/10* (2018.02)

(58) Field of Classification Search
CPC . H04M 1/72572; H04W 76/10; H04W 4/021; H04W 4/023; H04W 16/18; G01S 1/68; G01S 19/51; H04L 67/26
See application file for complete search history.

(56) References Cited

U.S. PATENT DOCUMENTS

| | | |
|---|---|---|
| 7,089,241 B1 | 8/2006 | Alspector et al. |
| 7,689,507 B2 | 3/2010 | Hung et al. |
| 7,711,779 B2 | 5/2010 | Goodman et al. |
| 7,792,697 B2 | 9/2010 | Bhagchandani et al. |
| 8,094,803 B2 | 1/2012 | Danson et al. |
| 8,144,007 B2 | 3/2012 | Tuck et al. |
| 8,401,529 B1 | 3/2013 | Delker et al. |
| 8,521,132 B2 | 8/2013 | Washio |
| 8,571,919 B2 | 10/2013 | Rane et al. |
| 8,666,836 B2 | 3/2014 | Adams |
| 8,838,499 B2 | 9/2014 | Del Bene et al. |
| 9,167,078 B2 | 10/2015 | Spievak et al. |
| 9,686,402 B2 | 6/2017 | Hodge |

(Continued)

*Primary Examiner* — Dinh Nguyen
(74) *Attorney, Agent, or Firm* — Michael A. Springs; Moore & Van Allen PLLC; R.W. McCord Rayburn (57) ABSTRACT

A system for device customization based on beacon-determined device location is provided. The system comprises: a memory device with computer-readable program code stored thereon; a communication device connected to a network; a processing device, wherein the processing device is configured to execute the computer-readable program code to: establish a beacon device at a beacon location, the beacon device defining a communication range covering an area; determine a device location of a user device; determine that the device location of the user device is within the area of the beacon device at the beacon location; based on determining the user device is within the area, generate a data stream for the user device tailored for the beacon location; and present the data stream to the user device.

20 Claims, 6 Drawing Sheets

(56) References Cited

U.S. PATENT DOCUMENTS

| | | | |
|---|---|---|---|
| 2007/0206548 A1* | 9/2007 | Toskala | H04L 12/189 370/338 |
| 2008/0033852 A1 | 2/2008 | Megdal et al. | |
| 2008/0318592 A1* | 12/2008 | Mandalia | H04W 4/029 455/456.1 |
| 2010/0080163 A1* | 4/2010 | Krishnamoorthi | H04N 21/2385 370/312 |
| 2012/0018506 A1* | 1/2012 | Hammad | G06Q 30/06 235/375 |
| 2013/0191928 A1* | 7/2013 | Yin | G06F 21/10 726/27 |
| 2015/0364026 A1* | 12/2015 | Rubin | G06Q 10/063114 340/539.11 |
| 2016/0283989 A1* | 9/2016 | Esquilla, Jr. | G06Q 30/0281 |
| 2019/0066730 A1* | 2/2019 | Singh | G06F 16/78 |

\* cited by examiner

SYSTEM FOR DEVICE CUSTOMIZATION BASED ON BEACON-DETERMINED DEVICE LOCATION

BACKGROUND

Content-based user engagement achieved through streaming or pushing data to user devices continues to increase. Traditional engagement methods tend to canvas all users with generic data streams to encourage engagement, wherein user devices are presented with near-identical information regardless of location. Therefore, there exists a need for an improved system for customized user engagement based on user device location.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for device customization based on device location is provided. The system comprises: a memory device with computer-readable program code stored thereon; a communication device connected to a network; a processing device, wherein the processing device is configured to execute the computer-readable program code to: establish a device interaction zone, the device interaction zone defining a communication range covering an area; determine a device location of a user device; determine that the device location of the user device is within the area of the device interaction zone; prompt the user device to activate a communication channel at the device interaction zone; based on determining the user device is within the area and activating the communication channel, generate a data stream for the user device tailored for the device interaction zone; and present the data stream to the user device via the activated communication channel.

In one specific embodiment, determining that the device location of the user device is within the area of the device interaction zone further comprises determining a geolocation of the user device via a global positioning system of the user device.

In another embodiment the system further comprises a beacon device at a beacon location configured to generate the device interaction zone, wherein the beacon device is maintained by an entity associated with the beacon location.

In yet another embodiment, the data stream is continuously updated based on the device location of the user device relative to a plurality of device interaction zones.

In yet another embodiment, the processing device is further configured to: receive a user selection of a portion of the data stream on the user device; and selectively publish the portion of the data stream to other user devices based on the user selection. In yet another embodiment, the processing device is configured to link the user device and the other user devices based on selectively publishing the portion of the data stream to the other user devices based on the user selection.

In yet another embodiment, the data stream comprises one or more goals and milestones associated with the user.

In yet another embodiment, the processing device is further configured to generate a resource token associated with the device interaction zone based on the device location being within the area of the device interaction zone. In yet another embodiment, the device interaction zone is selected from the group consisting of a merchant location, a home location, and a financial institution location.

In yet another embodiment, the processing device is further configured to generate the data stream for a plurality of user devices based on a predetermined number of the plurality of user devices being located in the area of the device interaction zone.

A computer-implemented method for device customization based on device location is also provided. The computer-implemented method comprises: establishing a device interaction zone, the device interaction zone defining a communication range covering an area; determining a device location of a user device; determining that the device location of the user device is within the area of the device interaction zone; prompting the user device to activate a communication channel at the device interaction zone; based on determining the user device is within the area and activating the communication channel, generating a data stream for the user device tailored for the device interaction zone; and presenting the data stream to the user device via the activated communication channel.

In one specific embodiment, determining that the device location of the user device is within the area of the device interaction zone further comprises determining a geolocation of the user device via a global positioning system of the user device.

In another embodiment, the computer-implemented method further comprises generating the device interaction zone with a beacon device at a beacon location, wherein the beacon device is maintained by an entity associated with the beacon location.

In yet another embodiment, the data stream is continuously updated based on the device location of the user device relative to a plurality of device interaction zones.

In yet another embodiment, the computer-implemented method further comprises: receiving a user selection of a portion of the data stream on the user device; and selectively publishing the portion of the data stream to other user devices based on the user selection. In yet another embodiment, the computer-implemented method further comprises linking the user device and the other user devices based on selectively publishing the portion of the data stream to the other user devices based on the user selection.

In yet another embodiment, the data stream comprises one or more goals and milestones associated with the user.

A computer program product for device customization based on device location is also provided. The computer program product comprises a non-transitory computer-readable medium comprising computer-readable instructions, the computer-readable instructions, when executed by a processing device, cause the processing device to: establish a device interaction zone, the device interaction zone defining a communication range covering an area; determine a device location of a user device; determining that the device location of the user device is within the area of the device interaction zone; prompt the user device to activate a communication channel at the device interaction zone; based on determining the user device is within the area and activating the communication channel, generate a data stream for the user device tailored for the device interaction zone; and present the data stream to the user device via the activated communication channel.

In one specific embodiment, determining that the device location of the user device is within the area of the device interaction zone further comprises determining a geolocation of the user device via a global positioning system of the user device.

In another embodiment, the computer-readable instructions, when executed by the processing device, further cause the processing device to generate the device interaction zone with a beacon device at a beacon location, wherein the beacon device is maintained by an entity associated with the beacon location.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the system, as described herein leverage device geolocation and/or beacon-based network interaction areas and other specific-use computer systems to provide a novel approach for generating and presenting customized data streams to user devices based on user device location relative to established device interaction zones. The system is configured to monitor user device location relative to a network of established device interaction zones and/or beacons. Based on current and historical location history of the user device, the system is configured to generate a tailored data stream specific to the user device and associated user. In some embodiments, the data stream may comprise a current events or information feed as well as location-based resource tokens such as offers associated with a nearby device interaction zone. Additionally, the data stream may be generated to contain and track events, goals, milestones, or the like associated with the user. In additional embodiments, the system is configured to selectively publish portions of a user's tailored data stream to other user devices associated with similar users. The system may link the users and/or user devices to allow for further connection with like-minded individuals.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison).

As used herein, the term "user" may refer to any entity or individual associated with the location-based customization system. In some embodiments, a user may be a computing device user, a phone user, a mobile device application user, a customer of an entity or business, a system operator, and/or employee of an entity (e.g., a financial institution). In one embodiment, a user may be a customer with an associated device that comes into range of a device interaction zone and/or location beacon associated with a brick-and-mortar location. In some embodiments, the user is a customer of a financial institution, wherein milestones, goals, events, or the like are tracked through user interaction with an associated user device and/or application. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, ATMs, global positioning system (GPS) devices, gaming devices, or any combination of the aforementioned. The device may be used by the user to access the system directly or through an application, online portal, internet browser, virtual private network, or other connection channel. In another specific embodiment, the user device is a mobile device (e.g., a smart phone) associated with a user and configured with location-determining hardware and software (e.g., GPS). The user device comprises a display for providing a user interface to the user for interacting with an application and a presented data stream.

As used herein, the term "entity" may be used to include any organization or collection of users that may interact with the location-based customization system. An entity may refer to a business, company, or other organization that either maintains or operates the system or requests use and accesses the system. In one embodiment, the entity may be a business or financial entity. The terms "financial institution" and "financial entity" may be used to include any organization that processes financial transactions including, but not limited to, banks, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, "authentication information" may refer to any information that can be used to authenticate an identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In another specific embodiment, monitoring may comprise modifying a presented data stream based on user interactions and device locations.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted through use interaction with a data stream (e.g., in real-time). An interaction may include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views and/or transfers, etc.) and the like. In another example, an interaction may refer to a user communication via one or more channels (i.e., phone, email, text, instant messaging, brick-and-mortar interaction, and the like) with an entity and/or entity system to complete an operation or perform an action (e.g., complete a document). In yet another example, an interaction may comprise device interactions such as communication between one or more user devices, user interaction zones, and/or beacons configured for determining that the user devices are in a predetermined range or area.

Figure 1:
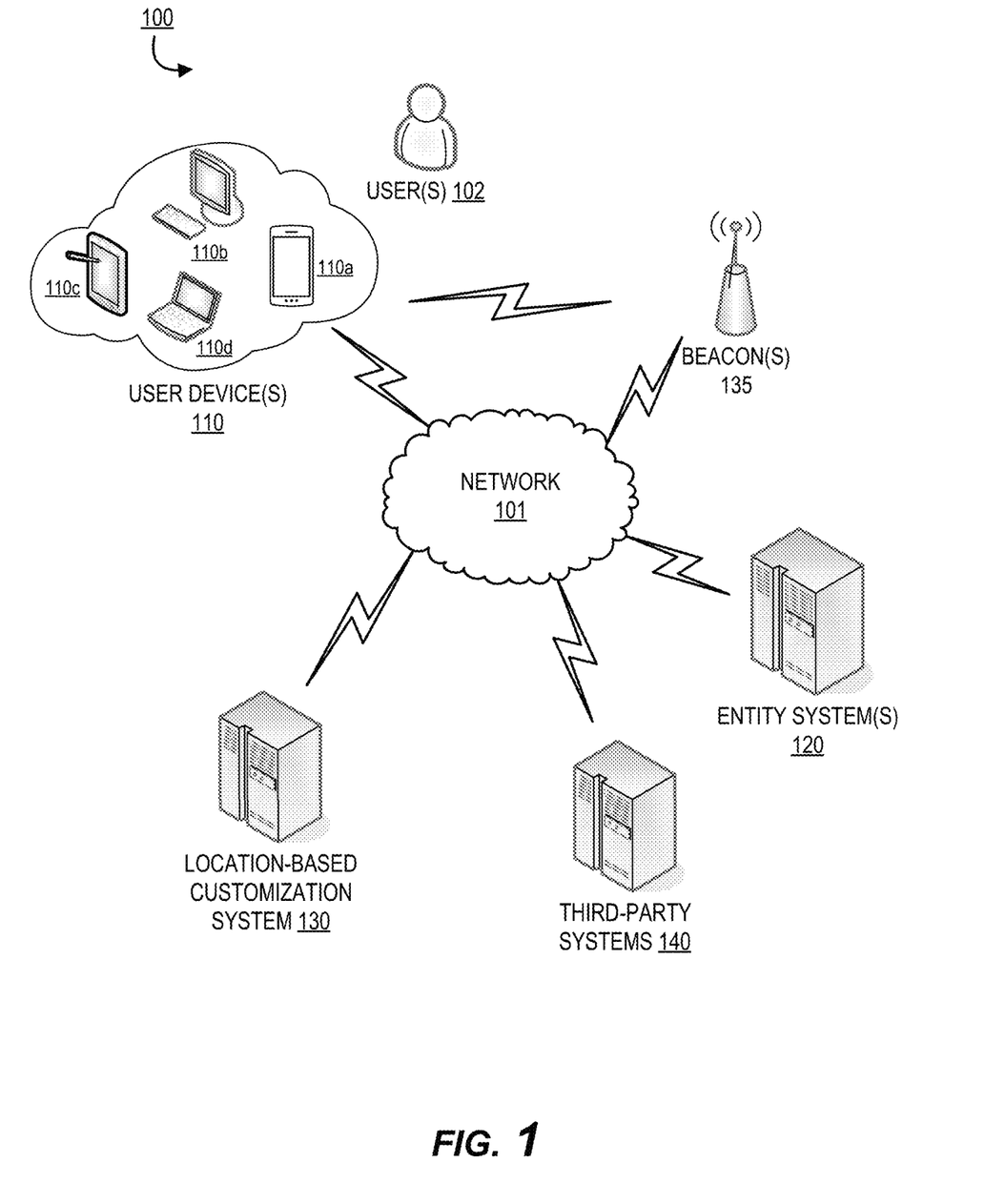
FIG. 1 provides a location-based customization system environment, in accordance with one embodiment of the invention.

FIG. 1 provides a location-based customization system environment 100, in accordance with one embodiment of the invention. As illustrated in FIG. 1, location-based customization system 130 is operatively coupled, via a network 101, to the user device(s) 110 (e.g., a plurality of user devices 110a-110d), the entity system(s) 120, third party systems 140, and one or more beacons 135. In this way, the location-based customization system 130 can send information to and receive information from the user device 110, the entity system 120, the third party systems 140, and the one or more beacons 135. In the illustrated embodiment, the plurality of user devices 110a-110d provide a plurality of communication channels through which the entity system 120 and/or the location-based customization system 130 may communicate with the user 102 over the network 101.

In the illustrated embodiment, the location-based customization system 130 further comprises the one or more beacons 135 which may be separate systems operating together with the location-based customization system 130 or integrated within the location-based customization system 130. In some embodiments, the beacons 135 further include device hardware and/or software for locating user devices within a communicable range or area output by the beacon. For example, the beacons 135 may be configured to determine when a user device enters or leave the defined area (i.e., geo-fencing or the like). In other embodiments, the system may not require beacon devices for determining a user device location, wherein the system is configured to determine a location of the user device based hardware and/or software residing in the user device itself (e.g., GPS).

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the beacons 135 are configured to generate a local area network for communication with user devices within the generated area either in addition or supplementary to the network 101.

In some embodiments, the user 102 is an individual interacting via a user device with a data stream generated by the system at a device interaction zone or location. In one embodiment, the data stream may be generated or modified, for example, by one or more entity systems 120 while the data stream between the user device 110 and the entity system 120 is monitored by the location-based customization system 130 over the network 101. In some embodiments a user 102 is a user requesting service from an entity or third party or entering a brick-and-mortar location associated with an entity or third party. In an alternative embodiment, the user 102 is an individual interacting with the location-based customization system 130 over the network 101 and monitoring input of information from the entity systems 120 to the location-based customization system 130 for processing and analysis (e.g., an employee of the entity operating and/or monitoring the systems 120, 130).

Figure 2:
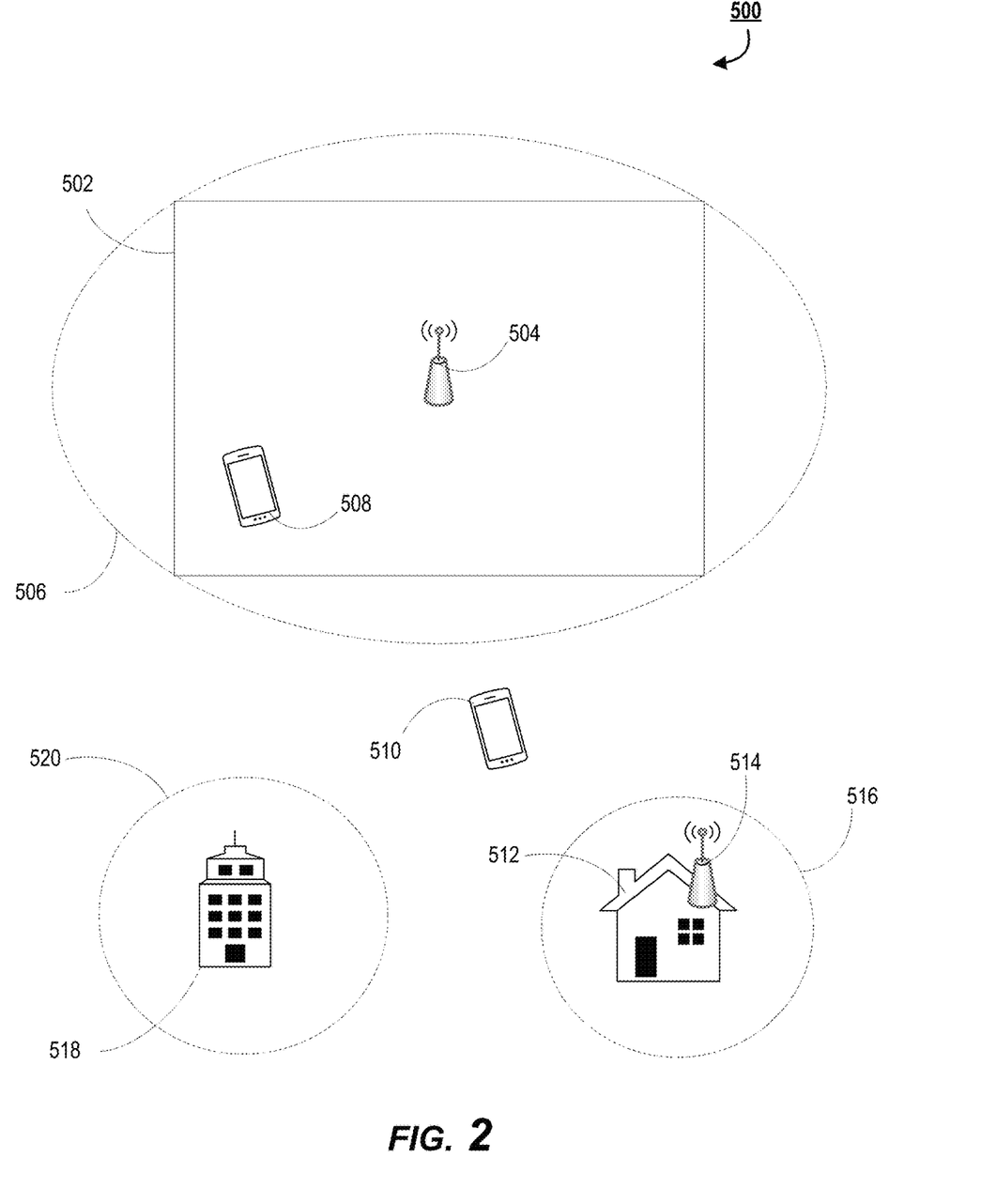
FIG. 2 provides a location-based customization environment leveraging device interaction zones, in accordance with one embodiment of the invention.

FIG. 2 provides a location-based customization environment leveraging device interaction zones and, in some embodiments, beacon devices, in accordance with one embodiment of the invention. In some embodiments the environment of FIG. 2 is the same system environment as previously described with respect to FIG. 1. The illustrated environment 500 comprises a first location 502 that further comprises a first beacon device 504. Beacon device 504 defines a communication range covering a first area 506 defining a device interaction zone or location. In the illustrated embodiment, a first mobile user device 508 is located within the area 506 defined by the range of the first beacon 504. As the first mobile user device 508 is within the area 506 defined by the first beacon 504, the first mobile user device 508 and the first beacon 504 may communicate with one another. In a specific example, the devices 504, 508 may communicate to determine that the first mobile user device 508, and most likely an associated user, are within the area 506 and the location 502.

Also illustrated in FIG. 2, a second mobile user device 510 is positioned outside of the area 506 of the first beacon 504. As such, in some embodiments, the second mobile user device 510 and the first beacon 504 are not in communication. A second location 512 is also illustrated, wherein the second location 512 comprises a second beacon 514 defining a second area 516 or device interaction zone. In the illustrated embodiment, neither the first nor second mobile user devices 508, 510 are located with the area 516. In one exemplary embodiment, the first location 502 is a business, store, or the like visited by a user associated with the first mobile user device 508 and the second location is the user's home or the like.

In another embodiment either in addition to or supplementary to the environment of FIG. 2, the system may continuously track a user device location via a GPS associated with the user device. In this way, the system is configured to track movement and location of the user device and an associated user to provide enhanced user engagement as further described herein. In some embodiments, a device interaction zone or location may be established without beacon hardware, wherein a geographic location of a user device itself may be monitored and tracked relative to a predefined geographic area or region to determine when the user device enters the predefined area. For example, in FIG. 2, a third location 518 is illustrated comprising a third area 520 providing a third device interaction zone without a beacon device present. Instead, the geolocation a user device (e.g., user devices 508, 510) are tracked relative to the geographic coordinates defining area 520.

While only three separate, device interaction zones or locations are illustrated in the embodiment of FIG. 2, it should be understood that a plurality of device interaction zones (e.g., beacon-based, geolocation-based, or a combination) may be employed by the system to define various locations having unique interactions with user devices entering, leaving, or remaining in a device interaction zone area or communication range. It should also be understood, that while the circular or oval-shaped communication range of each of the device interaction zones approximately covers the entirety of each location, it is conceived that area shapes and ranges may be larger or smaller than an associated brick-and-mortar location footprint in other embodiments.

Figure 3:
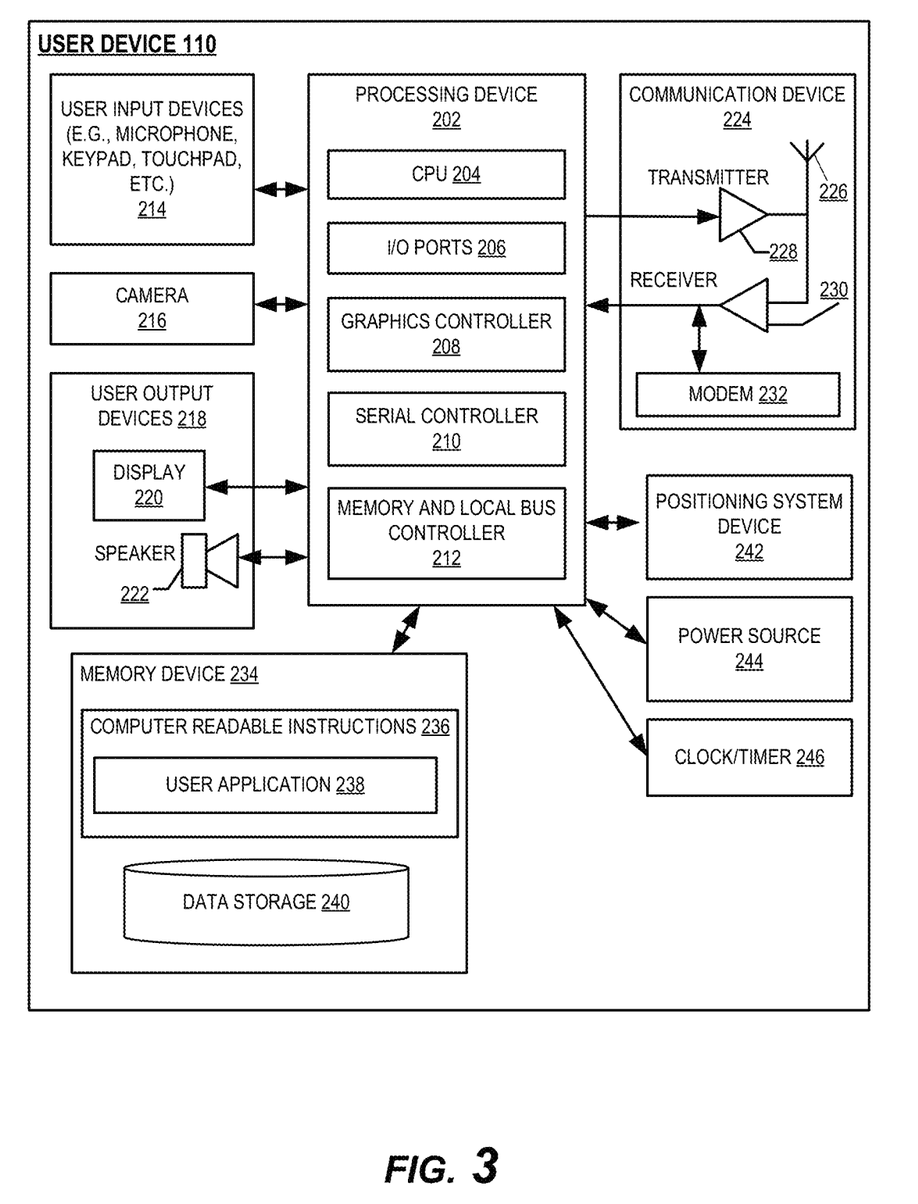
FIG. 3 provides a block diagram of a user device, in accordance with one embodiment of the invention.

FIG. 3 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. In one embodiment, the camera 216 may include a scanner or any other image capturing device. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100 while providing access to a generated data stream tailored for the user device 110 and associated user. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In some embodiments, the user application 238 is an application providing access to a tailored user data stream allowing for user interaction with the data stream via a user interface of the user application 238.

The processing device 202 may be configured to use the communication device 224 to communicate with one or more other devices on a network 101 such as, but not limited to the entity system 120 and the location-based customization system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 101. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Figure 4:
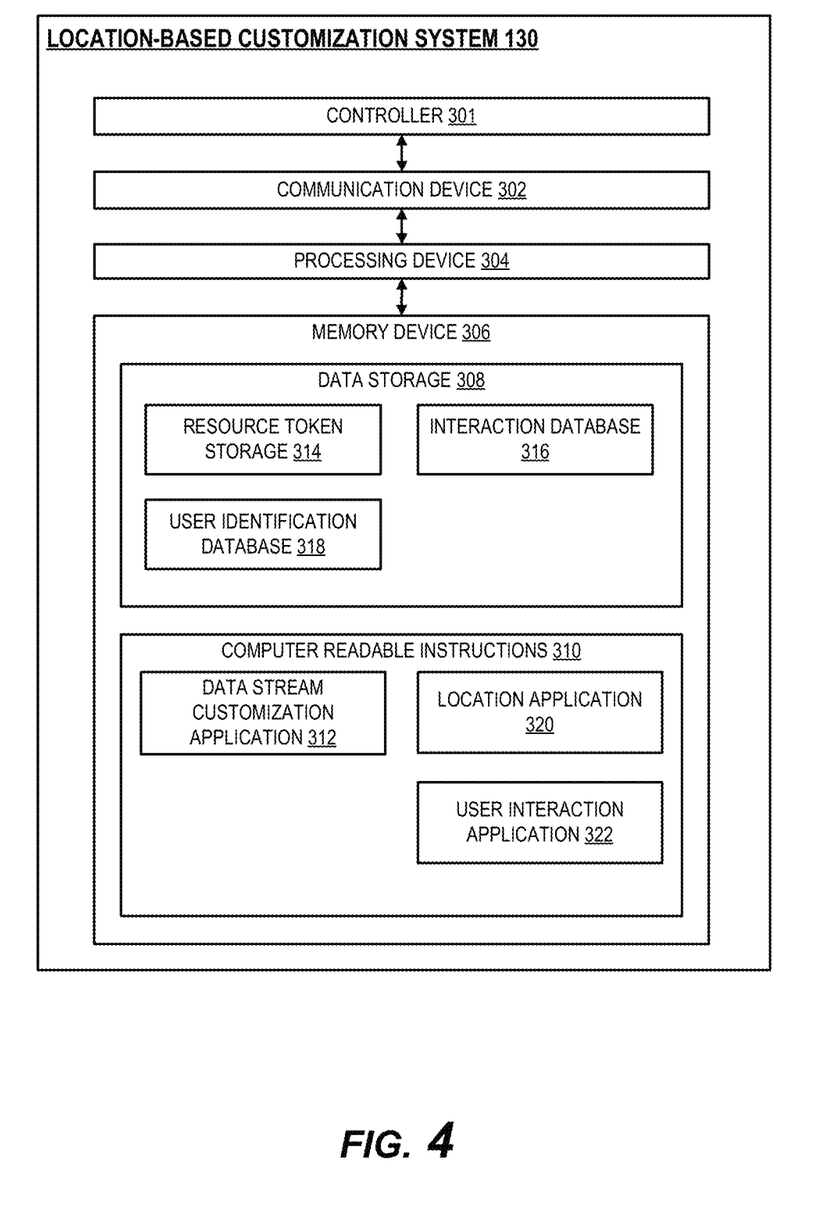
FIG. 4 provides a block diagram of a location-based customization system, in accordance with one embodiment of the invention.

FIG. 4 provides a block diagram of a location-based customization system 130, in accordance with one embodiment of the invention. The location-based customization system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, beacons 135, third party systems 140, and/or the location-based customization system 130, in order to interface and manage data flow between systems while executing commands to control the systems. In some embodiments, the controller may be integrated into one or more of the systems described herein. In other embodiments, the controller may be a separate system or device. In some embodiments, the controller may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 4, the location-based customization system 130 comprises computer-readable instructions 310 stored in the memory device 306, which in one embodiment includes the computer-readable instructions 310 of a data stream customization application 312, a location application 320, and a user interaction application 322. The data stream customization application 312 is configured to generate a tailored data stream for a user and present the data stream to a user device based on the user device location and or other user information (e.g., current and historical events, milestone, goals, etc.). The location application 320 is configured to control beacon communication with the one or more user devices and to determine user device location through interaction with the beacons and/or interaction zones in order to determine when and how to generate and/or modify a data stream. The user interaction application 322 may be configured to control all user interactions with the data stream presented to the user, wherein one or more actions may be triggered as a result of a user interaction (e.g., delivery of resource tokens to the user device in the data stream).

In some embodiments, the memory device 306 includes data storage 308 for storing data related to the system environment, but not limited to data created and/or used by the data stream customization application 312, location application 320, and user interaction application 322. Data stored in the data storage 308 may comprise resource token storage 314, an interaction database 316, and a user identification database 318.

Resource token storage 314 is used to store resource tokens (e.g., offers, discounts, rewards, funds, or the like) that may be provided to user devices through the data stream. While the resource token storage 314 is shown in FIG. 4 as part of the location-based customization system 130, in other embodiments, resource token storage may be included on one or more other systems (e.g., entity systems 120) to supplement or as an alternative to resource token storage 314 on the location-based customization system 130. In one embodiment, tokens are stored on the entity systems 120, wherein the location-based customization system 130 pulls the files from the entity systems 120.

The interaction database 316 is used to store information regarding past interactions (e.g., transactions, account actions, location changes, interaction with the data stream, etc.) during a session with the user 102. In some embodiments, the interaction database 316 may be configured to store data from an incoming data stream in real-time. The interaction database 316 may further include information or data related to the interactions such as user data, user selections, and the like. The system may be configured to access and update stored information and data stored in the interaction database 316 as additional information is collected.

In one embodiment of the invention, the location-based customization system 130 may associate with applications having computer-executable program code that instruct the processing device 304 to perform certain functions described herein. In one embodiment, the computer-executable program code of an application associated with the user device 110, beacons 135, third party systems 140, and/or the entity systems 120 may also instruct the processing device 304 to perform certain logic, data processing, and data storing functions of the application.

Embodiments of the location-based customization system 130 may include multiple systems, servers, computers or the like maintained by one or many entities. In some embodiments, the location-based customization system 130 may be part of the entity systems 120. In other embodiments, the entity systems 120 are distinct from the location-based customization system 130. The location-based customization system 130 may communicate with the entity systems 120 via a secure connection generated for secure encrypted communications between the two systems either over the network 101 or alternative to the network 101.

Figure 5:
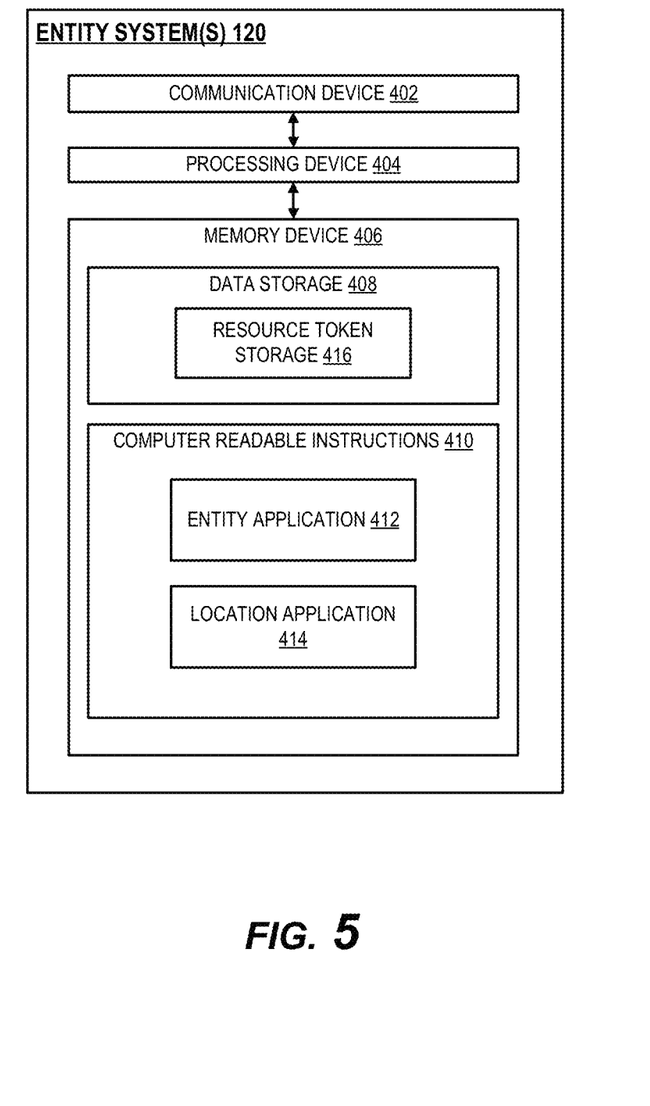
FIG. 5 provides a block diagram of an entity system, in accordance with one embodiment of the invention.

As illustrated in detail in FIG. 5, the environment 100 further includes one or more entity systems 120 which are connected to the user device 110, the location-based customization system 130, beacons 135, and the third party systems 140. The entity systems 120 may be associated with one or more entities, institutions or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110, the beacons 135, and the location-based customization system 130 to provide access to information and accounts stored and maintained on the entity systems 120. In some embodiments, the entity system 120 may communicate with the location-based customization system 130 during an interaction with a user 102 in real-time, wherein user interactions may be monitored and processed by the location-based customization system 130. In some embodiments, data storage 408 comprises resource token storage 416 to either supplement or replace storage 314 of the location-based customization system 130 as previously discussed.

The systems of the environments 100 and 500 are configured to monitor user device location relative to a network of established device interaction zones and/or beacons. Based on current and historical location history of the user device, the system is configured to generate a tailored data stream specific to the user device and associated user. In some embodiments, the data stream may comprise a current events or information feed as well as location-based resource tokens such as offers associated with a nearby device interaction zone. Additionally, the data stream may be generated to contain and track events, goals, milestones, or the like associated with the user. In additional embodiments, the system is configured to selectively publish portions of a user's tailored data stream to other user devices associated with similar users. The system may link the users and/or user devices to allow for further connection with like-minded individuals.

Figure 6:
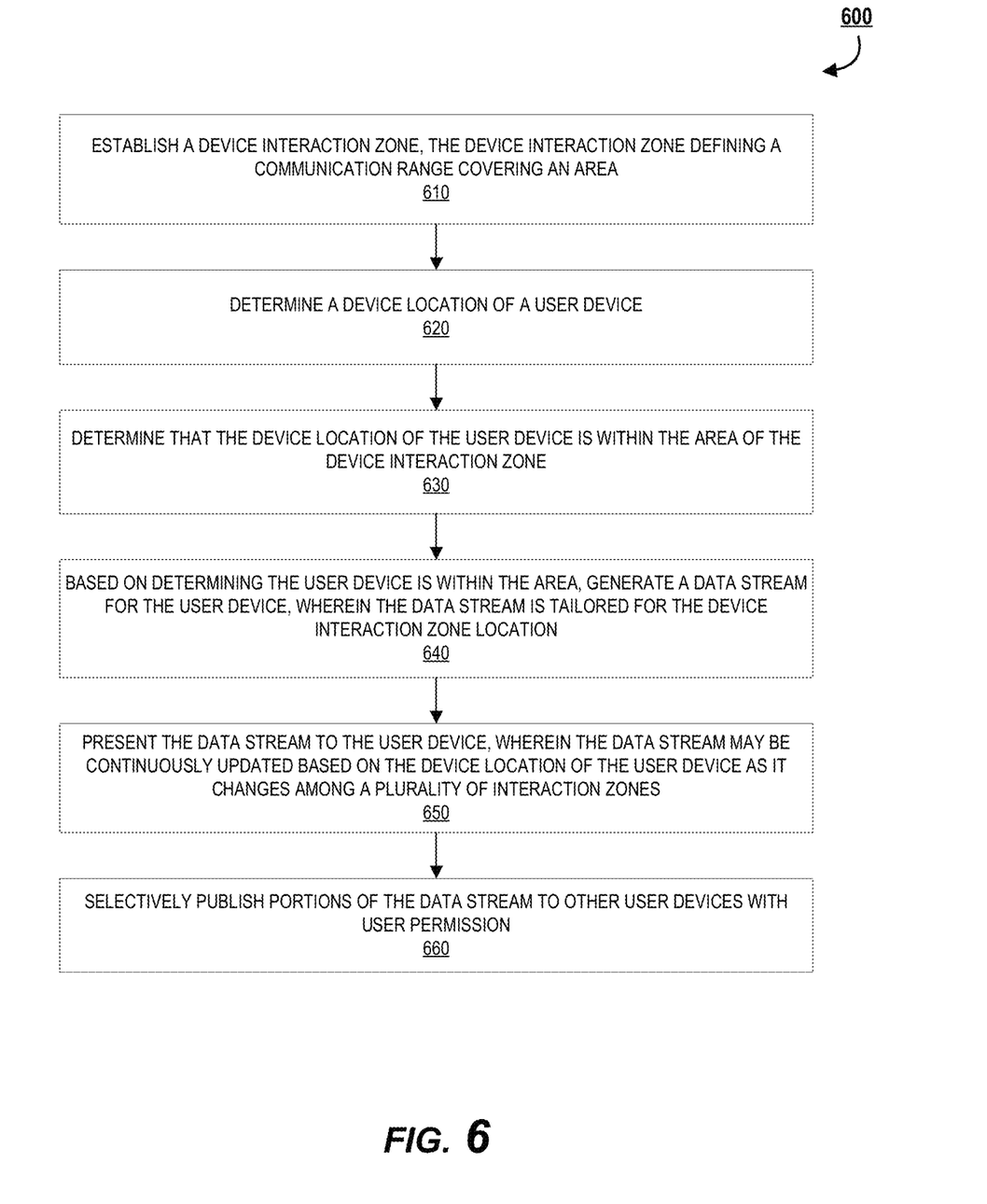
FIG. 6 provides a high level process flow for customizing user device data streams based on device location, in accordance with one embodiment of the invention.

The processes described herein by the invention utilize the system environments 100 and/or 500, in various embodiments, to determine a location of a user device using geolocation and/or beacon-based technology in order to provide tailored data streams for enhanced user engagement. FIG. 6 provides a high level process flow for customizing user device data streams based on device location, in accordance with one embodiment of the invention. As illustrated in block 610 of FIG. 6, the system first establishes a device interaction zone which may include one or a plurality of geolocation monitored zones and/or beacon locations generated by dedicated beacon device hardware. Non-limiting examples of device interaction zones include merchant locations, financial institutions, homes, and the like.

In some embodiments, a device interaction zone is a predefined geographic location defined by a series of coordinates, wherein a position of a user device relative to the coordinates is tracked to determine whether a user device is located at the device interaction zone. In other embodiments, a beacon device is configured to emit a communication network ranging over a predefined area. Establishing a beacon device may comprise installation of the beacon hardware (i.e., a communication device coupled to a computing device) at a location, wherein the beacon hardware is in communication with the systems described herein. In some embodiments, establishing the beacon device may further comprise connecting one or more beacons to the network (e.g., network 101) to enable communication with the location-based customization system 130 as described with respect to FIG. 1.

As illustrated in block 620, the system is configured to determine a device location of a user device. In some embodiments, the system may determine a device location of the user device using the beacon devices and established communication areas. In some embodiments, the system may be configured to only track the user device when the user device is within the area (i.e., the device location is approximately the same as the device interaction zone or location). When the user device is not in the area, the system may set a device location as currently unknown. Alternatively, the system may be configured to continuously monitor a location associated with a user device even when outside the range of a geolocation-derived device interaction zone and/or beacon devices of the system via GPS-based positioning associated with the user devices. In another embodiment, the system is configured to determine and monitor a location of user device through a combination of a beacon device network (i.e., a plurality of beacon devices) and GPS positioning of the user device (i.e., geo-positioning).

As illustrated in block 630, the system is configured to determine that the device location of the user device is within the area of the device interaction zone or location. Stated another way, the system may determine when the device location of the user device is the same as the device interaction zone, or when the device location is determined to be inside of the area defined by a zone. In one example, a user device location being within a beacon location area may indicate that the user device and the associated user have entered a location (e.g., entered a store, returned home, entered a bank, approached an ATM), wherein the system may be triggered to perform additional actions in response to the determine user device location. In another example, the GPS-determined location of the user device may be determined to be the same as a predefined set of geographic coordinates, wherein additional actions are then triggered.

As illustrated in block 640, based on determining that the user device is within the area of the device interaction zone, the system is configured to generate a data stream for the user device. A data stream may comprise a sequence of transmitted and received information (e.g., data packets) sent from a data provider. In some embodiments, the data stream may comprise user information (e.g., account information), current and historical events (e.g., news, status updates, communications, messages, reminders), user goals and milestones, and the like pulled into a single data source and provided to the user in viewable and digestible format for the user. In one embodiment, the data stream may further comprise web-browsing information or data associated with the user (e.g., visited websites, viewed media). In some embodiments, the data stream may further comprise resource tokens such as offers, rewards, discounts, or the like. The system is configured to provide a data stream that is tailored for a specific user to encourage user engagement. What is more, the data stream is customized based on the current user device location. For example, the system may be configured to generate offers specific to a current user device location to be included in the data stream. In some embodiments, the system may first prompt the user device to activate a geolocation sharing functionality or communication on the user device before generating a communication channel with the user device to share the data stream with the user. The user may be required by the system to enable geolocation communication by, for example, logging in to an account or otherwise providing authentication information to the system to grant permission. In this way, location-based communication may be optional and require users to opt-in.

As illustrated in block 650, the system is configured to present the data stream to the user device, wherein the data stream may be continuously updated based on the device location of the user device even as the device location changes either within the area of a single interaction zone or between different areas of separate interaction zones. The system may be configured to not only generate but also continuously modify a preexisting data stream based on the updated user device location for the specific interaction zone location (e.g., a specific merchant location a user entered). In some embodiments, the system may be continuously monitoring and updating the data stream for the user based on the user device location and user interactions with the data stream. In a specific example, the system may provide resource tokens to the user device via the data stream based on the current user location as detected by the beacons and/or device GPS.

The system is configured to display the data stream to the user on the user device via a display. In this way, the user is able to view and interact with entries in the data stream. For example, the user may select a resource token or other offer from the data stream after entering an associated interaction location. The user may also interact with the data stream to track the user's goals, milestones, events, and the like as well as those of other users.

As illustrated in block 660, the system may be configured to selectively publish portions of the data stream to other devices with permission of the user. The system may be configured to receive a user selection via the user interface of one or more portions of the data stream to publish. The published portions may be communicated back to the system and distributed out to other user devices in a public or semi-private forum via the other user devices data streams. In other embodiments, the system may be configured to automatically share portions of the data stream with other user and user devices based on shared attributes (i.e., shared locations, events, goals, milestones or the like). In one embodiment, based on the shared attributes, the system may generate a link between similar users and their associated devices, wherein portions of each user's data stream are published to the other users.

In one embodiment, the system may be further configured to generate and/or modify a data stream based on a predetermined number of users and associated user devices being located in the area of a defined device interaction zone simultaneously or cumulatively over a predetermined period of time. In an exemplary embodiment, based on determining that a predetermined number of users are located at the same interaction zone location, the system may be configured to trigger transmission of a resource token to the data streams of the associated user devices. A maintaining entity of the system may determine conditions for group user resource distribution such as by setting a required number of user devices or period of time. In this way, the users may be enabled to activate the group resource tokens together thereby enhancing user engagement.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with location-based data stream customization.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for location-based data stream customization, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for device customization based on device location, the system comprising:
    a memory device with computer-readable program code stored thereon;
    a communication device connected to a network;
    a processing device, wherein the processing device is configured to execute the computer-readable program code to:
        establish a plurality of device interaction zones, wherein each device interaction zone of the plurality of device interaction zones defines a communication range covering an area, and wherein the plurality of device interaction zones comprises a merchant location and a home location;
        continuously monitor a device location of a user device;
        determine that the device location of the user device is within a first area of a first device interaction zone of the plurality of device interaction zones;
        prompt the user device to activate a communication channel at the first device interaction zone;
        based on determining the user device is within the first area and activating the communication channel, generate a data stream for the user device tailored for the first device interaction zone, wherein the data stream comprises user information, events, and resource tokens;
        present the data stream to the user device via the activated communication channel; and
        continuously update, based on the device location of the user device relative to the plurality of device interaction zones, the data stream.

2. The system of claim 1, wherein continuously monitoring the device location of the user device comprises determining a geolocation of the user device via a global positioning system of the user device.

3. The system of claim 1, further comprising a beacon device at a beacon location configured to generate the first device interaction zone, wherein the beacon device is maintained by an entity associated with the beacon location.

4. The system of claim 1, wherein the processing device is further configured to:
    receive a user selection of a portion of the data stream on the user device; and
    selectively publish the portion of the data stream to other user devices based on the user selection.

5. The system of claim 4, wherein the processing device is configured to link the user device and the other user devices based on selectively publishing the portion of the data stream to the other user devices based on the user selection.

6. The system of claim 1, wherein the data stream comprises one or more goals and milestones of a user associated with the user device.

7. The system of claim 1, wherein the processing device is further configured to generate a first resource token of the resource tokens associated with the first device interaction zone based on the device location being within the first area of the first device interaction zone.

8. The system of claim 1, wherein the plurality of device interaction zones comprises a financial institution location.

9. The system of claim 1, wherein the processing device is further configured to generate the data stream for a plurality of user devices based on a predetermined number of the plurality of user devices being located in the first area of the first device interaction zone.

10. A computer-implemented method for device customization based on device location, the computer-implemented method comprising:
    establishing a plurality of device interaction zones, wherein each device interaction zone of the plurality of device interaction zones defines a communication range covering an area, and wherein the plurality of device interaction zones comprises a merchant location and a home location;

continuously monitoring a device location of a user device;

determining that the device location of the user device is within a first area of a first device interaction zone of the plurality of device interaction zones;

prompting the user device to activate a communication channel at the first device interaction zone;

based on determining the user device is within the first area and activating the communication channel, generating a data stream for the user device tailored for the first device interaction zone, wherein the data stream comprises user information, events, and resource tokens;

presenting the data stream to the user device via the activated communication channel; and continuously updating, based on the device location of the user device relative to the plurality of device interaction zones, the data stream.

11. The computer-implemented method of claim 10, wherein continuously monitoring the device location of the user device comprises determining a geolocation of the user device via a global positioning system of the user device.

12. The computer-implemented method of claim 10, further comprising generating the first device interaction zone with a beacon device at a beacon location, wherein the beacon device is maintained by an entity associated with the beacon location.

13. The computer-implemented method claim 10, further comprising:

receiving a user selection of a portion of the data stream on the user device; and selectively publishing the portion of the data stream to other user devices based on the user selection.

14. The computer-implemented method of claim 13, further comprising linking the user device and the other user devices based on selectively publishing the portion of the data stream to the other user devices based on the user selection.

15. The computer-implemented method of claim 10, wherein the data stream comprises one or more goals and milestones of a user associated with the user device.

16. A computer program product for device customization based on device location, wherein the computer program product comprises a non-transitory computer-readable medium comprising computer-readable instructions, the computer-readable instructions, when executed by a processing device, cause the processing device to:

establish a plurality of device interaction zones, wherein each device interaction zone of the plurality of device interaction zones defines a communication range covering an area, and wherein the plurality of device interaction zones comprises a merchant location and a home location;

continuously monitor a device location of a user device;

determine that the device location of the user device is within a first area of a first device interaction zone of the plurality of device interaction zones;

prompt the user device to activate a communication channel at the first device interaction zone;

based on determining the user device is within the first area and activating the communication channel, generate a data stream for the user device tailored for the first device interaction zone, wherein the data stream comprises user information, events, and resource tokens;

present the data stream to the user device via the activated communication channel; and continuously update, based on the device location of the user device relative to the plurality of device interaction zones, the data stream.

17. The computer program product of claim 16, wherein continuously monitoring the device location of the user device comprises determining a geolocation of the user device via a global positioning system of the user device.

18. The computer program product of claim 16, wherein the computer-readable instructions, when executed by the processing device, further cause the processing device to generate the first device interaction zone with a beacon device at a beacon location, wherein the beacon device is maintained by an entity associated with the beacon location.

19. The computer program product of claim 16, wherein the computer-readable instructions, when executed by the processing device, further cause the processing device to:

receive a user selection of a portion of the data stream on the user device; and selectively publish the portion of the data stream to other user devices based on the user selection.

20. The computer program product of claim 19, wherein the computer-readable instructions, when executed by the processing device, further cause the processing device to link the user device and the other user devices based on selectively publishing the portion of the data stream to the other user devices based on the user selection.

* * * * *